(12) United States Patent
Huitema et al.

(10) Patent No.: US 7,786,951 B2
(45) Date of Patent: Aug. 31, 2010

(54) APPARATUS WITH DISPLAY

(75) Inventors: Hjalmar Edzer Ayco Huitema, Eindhoven (NL); Eugenio Cantatore, Eindhoven (NL); Gerwin Hermanus Gelinck, Eindhoven (NL); Bas Jan Emile Van Rens, Eindhoven (NL)

(73) Assignee: Polymer Vision Limited, Eindhoven (NL)

( * ) Notice: Subject to any disclaimer, the term of this patent is extended or adjusted under 35 U.S.C. 154(b) by 1130 days.

(21) Appl. No.: 10/552,106

(22) PCT Filed: Mar. 26, 2004

(86) PCT No.: PCT/IB2004/050340

§ 371 (c)(1),
(2), (4) Date: Oct. 3, 2005

(87) PCT Pub. No.: WO2004/088490

PCT Pub. Date: Oct. 14, 2004

(65) Prior Publication Data

US 2006/0192726 A1    Aug. 31, 2006

(30) Foreign Application Priority Data

Apr. 1, 2003    (EP) ................... 03100854

(51) Int. Cl.
*G09G 5/00* (2006.01)
(52) U.S. Cl. ....................... 345/1.2; 345/1.1
(58) Field of Classification Search ............. 345/1.1,
345/1.2, 1.3, 55, 84, 87, 105, 106, 107, 156,
345/901
See application file for complete search history.

(56) References Cited

U.S. PATENT DOCUMENTS

| | | | | |
|---|---|---|---|---|
| 5,467,102 A | * | 11/1995 | Kuno et al. | 345/1.3 |
| 5,818,165 A | * | 10/1998 | Malhi | 313/495 |
| 6,222,507 B1 | | 4/2001 | Junichi | |
| 6,327,482 B1 | * | 12/2001 | Miyashita | 455/566 |
| 6,343,006 B1 | * | 1/2002 | Moscovitch et al. | 361/681 |
| 6,473,072 B1 | * | 10/2002 | Comiskey et al. | 345/173 |
| 6,788,292 B1 | * | 9/2004 | Nako et al. | 345/173 |
| 6,906,705 B2 | * | 6/2005 | Matsuo et al. | 345/206 |
| 6,940,497 B2 | * | 9/2005 | Vincent et al. | 345/204 |
| 2002/0055938 A1 | * | 5/2002 | Matsuo et al. | 707/104.1 |
| 2002/0090980 A1 | * | 7/2002 | Wilcox et al. | 455/566 |
| 2005/0091431 A1 | * | 4/2005 | Olodort et al. | 710/72 |
| 2005/0110702 A1 | * | 5/2005 | Aoki et al. | 345/30 |
| 2006/0034039 A1 | * | 2/2006 | Van Rens | 361/681 |

FOREIGN PATENT DOCUMENTS

| | | |
|---|---|---|
| CN | 1359077 A | 7/2002 |
| FR | 2436455 A | 9/1978 |
| GB | 2 360 622 | 9/2001 |
| WO | WO 01/42891 A1 | 6/2001 |

* cited by examiner

*Primary Examiner*—My-Chau T Tran
(74) *Attorney, Agent, or Firm*—Leydig, Voit & Mayer Ltd.

(57) ABSTRACT

A (display) device (31,4,5) contains multiple panels (3,7) like e.g. displays. Every display can be used to display its own content and can be rolled out of a sub-housing (5) like e.g. a cartridge separately. In different configurations the same cartridge can be arranged in such a way that the panels are used for a separate functionality or multiple display panels form one big screen.

19 Claims, 9 Drawing Sheets

APPARATUS WITH DISPLAY

Figure 1A:
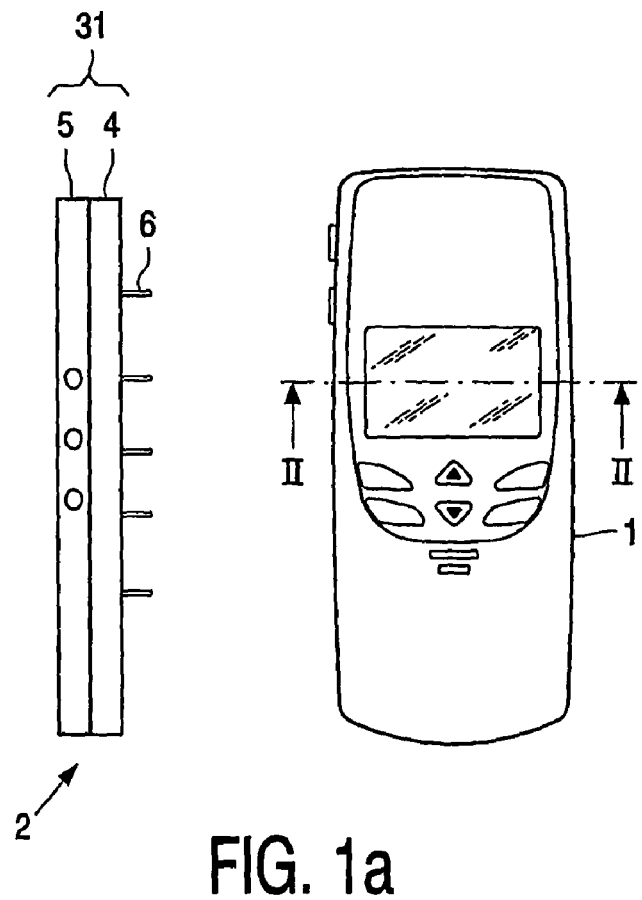

The invention relates to an electronic assembly comprising an electronic apparatus and a panel device, the panel device having a first panel provided with driving electronics, the electronic apparatus being provided with means for exchanging control parameters with the panel device.

The invention furthermore relates to a panel device for use in such an apparatus and to a housing for at least two such panels.

The panel device may be a touch screen or a display device belonging to one of the groups of liquid crystal display devices, electrochromic display devices, electrophoretic display devices and reflective display devices including an interferometric modulator and luminescent display devices. The display devices may be passive or active matrix display devices. Examples of such active matrix display devices are TFT-LCDs or AM-LCDs, (O)LED devices, which are used in laptop computers and in organizers, but also find an increasingly wider application in GSM telephones.

Such matrix displays are generally addressed by means of selection lines which periodically address (a group of) selection lines or rows, e.g. via switches such as TFT (MOS)-transistors, while at the same time data (voltages) are provided via (a group of) data lines or columns. So "control parameters" is meant to comprise these driving signals, but may also comprise other interface signals between the display device (module) and the electronic apparatus. Similar remarks apply to the control and sensing of the touch panel or any other panel which is used in an interface mode with the electronic apparatus such as e.g. a front light or back light panel, or a panel controlling 3D effects. For many applications this should preferably be a standard interface. It may for instance comprise signals like a vertical synchronization pulse, a horizontal synchronization pulse, clock signals etcetera. It may also comprise information with respect to the size and resolution or any other relevant information (color or monochrome) with respect to an application.

In many applications nowadays, like laptop computers and organizers (but of course also in GSM telephones) portable (display) devices are preferred. Portability however goes at the cost of a higher chance of breaking the display since most displays are rather fragile systems. The costs of exchanging a broken display from a portable device however are so prohibitively high that usually the device is replaced completely. Since 99% of the functionality still remains available, this is a waste of resources. The reasons for these high costs are twofold. First, the display is molded into the device to give it added strength. Consequently, removing the display entails breaking the device. Second, once the display is removed a new display has to be aligned in the device and considering the large amount of connections (tens of thousands to more than a million) this is a complex task.

In some of these applications also the need is felt to have the possibility of having more than one display function available for instance having auxiliary functions available (like dictionaries, specific data bases etc.) without losing sight of the main application. Especially when using a (smaller) mobile electronic apparatus, this leads to displaying these functions on a too small field In other applications, especially mobile telephones, a need is felt to have a display area, which is larger than the area available within the device. Introducing rollable displays has solved this need. When moving to rollable displays the above mentioned protective measures have to be omitted while the substrates generally become much thinner and therefore more vulnerable.

It is one of the objects of the invention to overcome at least partly the above-mentioned problem. To this end in a first electronic apparatus according to the invention the panel device is provided outside the electronic apparatus and the panel is movable between a first position and a second position in which the panel device has at least one housing, which comprises the first panel in one of said first and second positions and which housings comprises at least one further panel which is movable between a first position and a second position at least one of the panels being rollable or foldable.

Now several panels can be used without interfering the functions displayed on said panels, which overcomes the problem mentioned above. Also one or more of the panels can have an input function, like a touch screen or a keyboard-like function.

A further application can be found in electronic books in which more than one (e.g. four) pages are available, introducing the possibility of thumbing.

The panel generally is movable between a first position in which the panel substantially is not visible and a second position in which at least part of the panel is visible. Intermediate distinct positions may be made available too.

By "substantially is not visible" it is meant that the greater part of actual panel is not visible to the human eye, be it because it is within a housing or because the panel is in a folded or rolled up position. The wording "part of the panel" need not refer to a viewable part of a display panel. The (display) panel may be realized as both foldable and rollable, in which case e.g. a substrate carrying separate (display) panels is rolled out in a folded position, after which it is unfolded.

The invention is based on the insight that rather than making the panels or displays more robust one can make use of panels or displays in housings or sub-housings (for instance cartridges) which panels (displays) (and housings or sub-housings) can be discarded after the panel (display) stops functioning. This is the more attractive when flexible panels (displays) (e.g. including integrated row and column drivers) are used and cheap "plastic electronics" become available. By providing the (display) panel in the housing or sub-housing the amount of driving electronics within such a housing or sub-housing is minimal, making the use of disposable (display) panels the more attractive.

By providing more than one panel in a housing the functionality is further increased leading to the possibilities, mentioned above.

The housing may be stored in an enclosure. Fixing means for fixing the housing (or a sub-housing) in the enclosure may be selected from the group of spindle mechanisms, clicking mechanisms, magnetic fixing and gluing. This opens the way to providing disposable display panels, which may be (temporarily) stored in such enclosures.

The panel device and the electronic apparatus may be mechanically interconnected or mechanically interconnectable, dependant on the kind of use. Also wireless communication is possible. This enables the use of such panel (display) devices in more than one apparatus and even opens the possibility of "loading" such devices with data, similar to loading badges, credit cards or similar devices.

A preferred embodiment has a housing comprising a sub-housing for each separate panel.

If one of the sub-housings is slidable along a central axis (and preferably also rotatable along said central axis) very compact cartridge-like devices can be obtained.

In one embodiment the sliding device comprises driving electronics while the sub-housings may have a sliding device in common.

A preferred embodiment has a housing comprising at least two panels, each separate panel being rollable from a separate axis. In such a device a driving device, which is rotatable, is preferably used.

These and other aspects of the invention are apparent from and will be elucidated with reference to the embodiments described hereinafter.

IN THE DRAWINGS

Figure 1B:
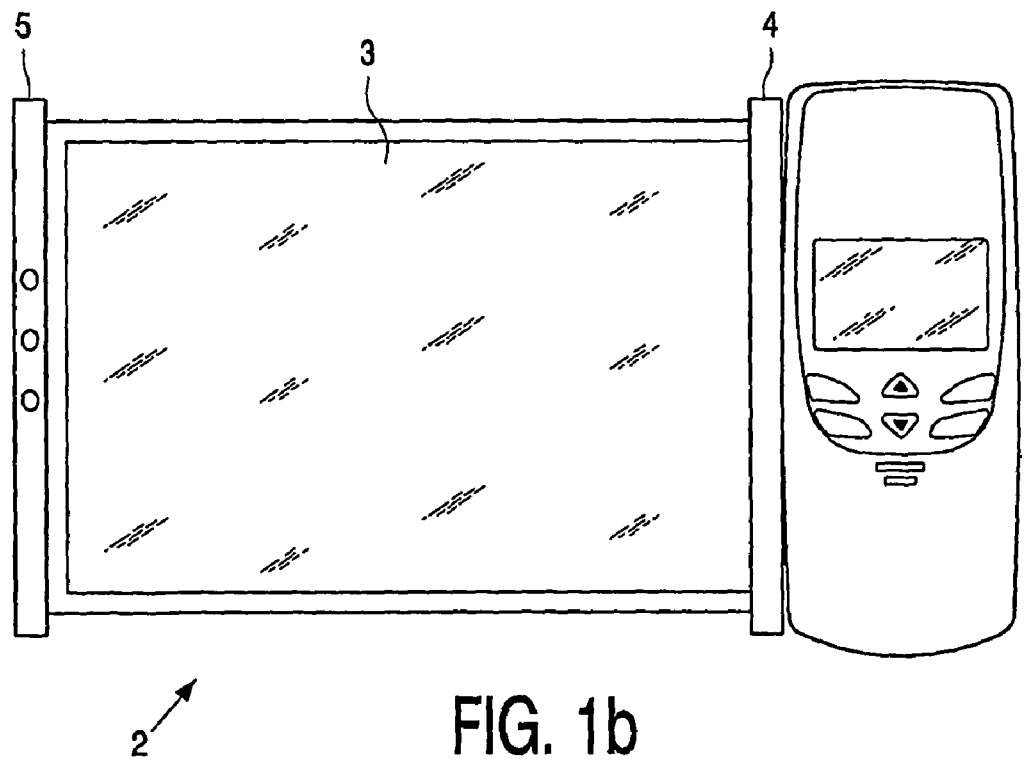

FIG. 1 shows the use of a rollable display device in mobile applications

Figure 2B:
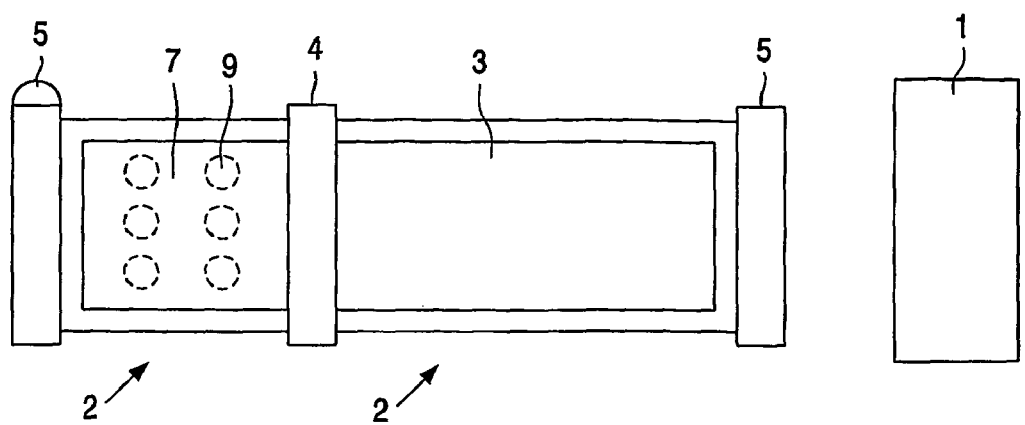
Figure 2B:
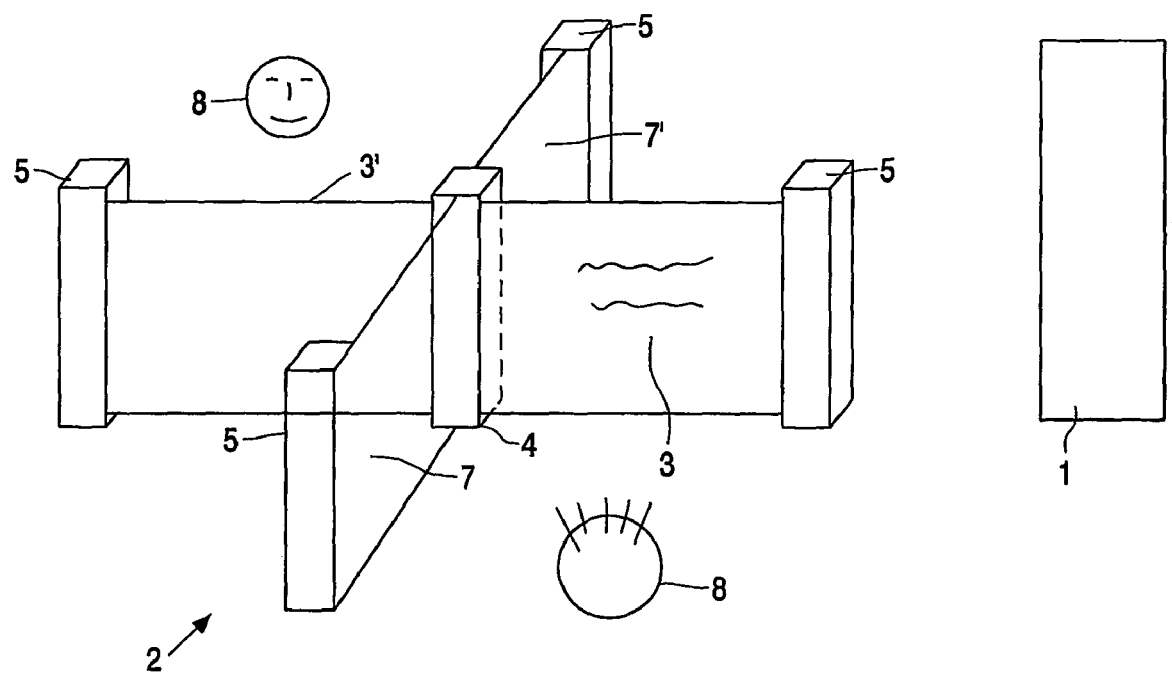
Figure 3:
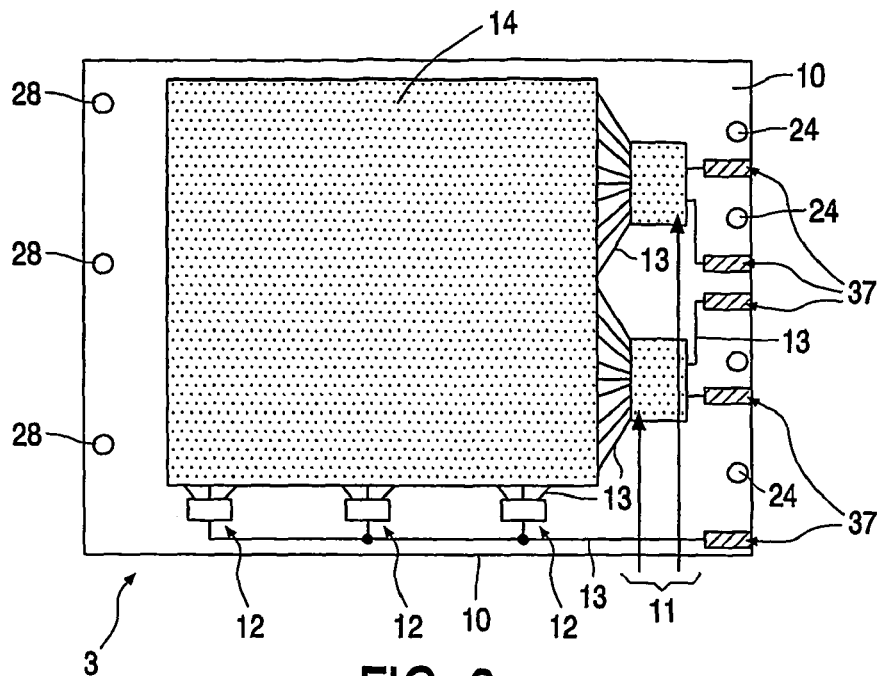
Figure 5:
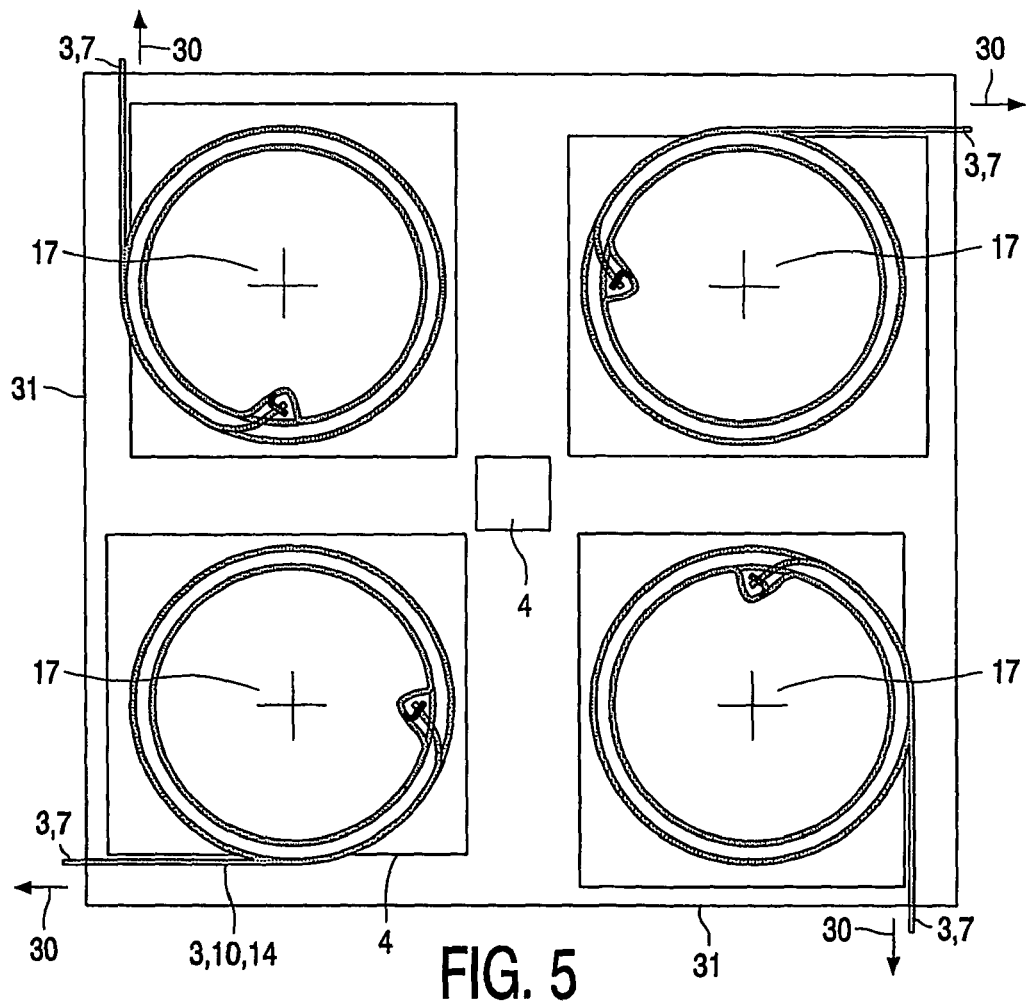
Figure 4:
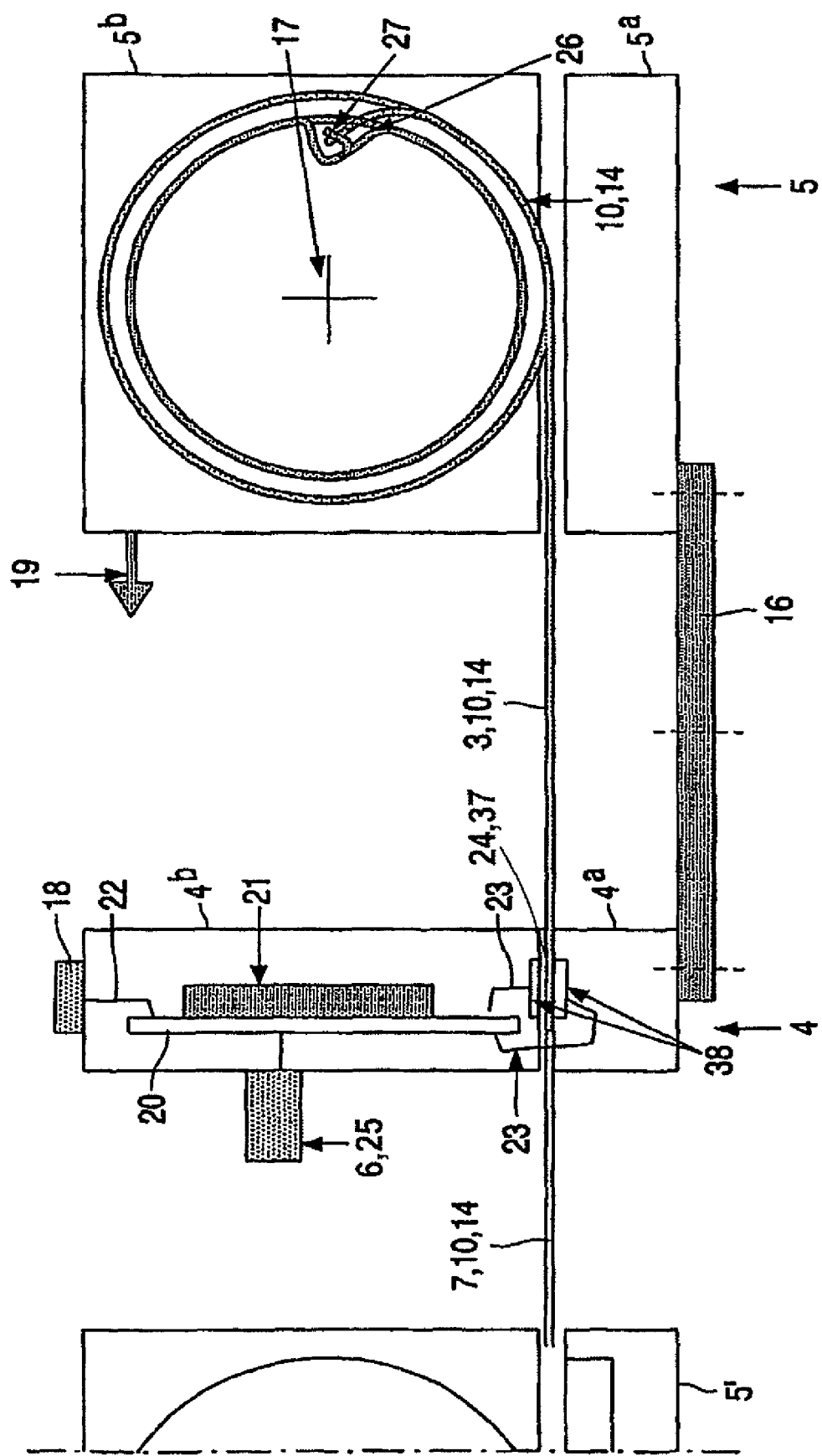
Figure 6A:
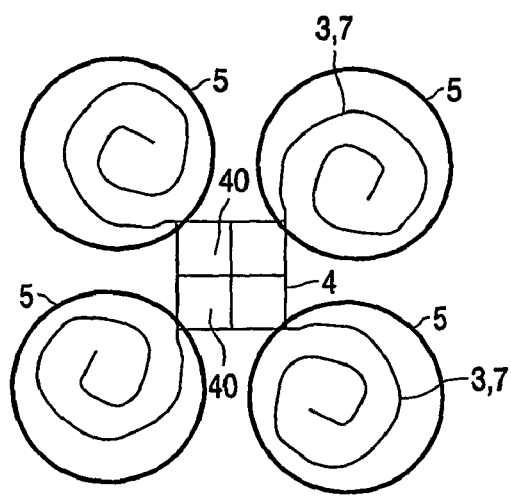
Figure 6B:
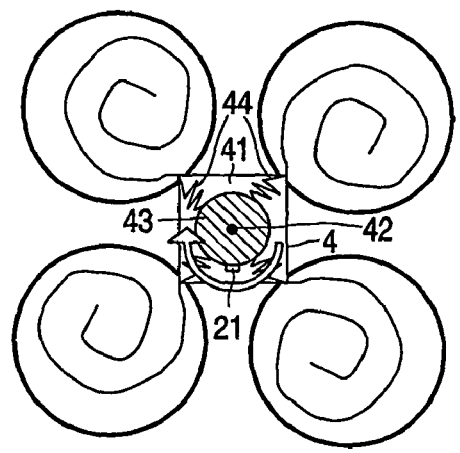
Figure 8:
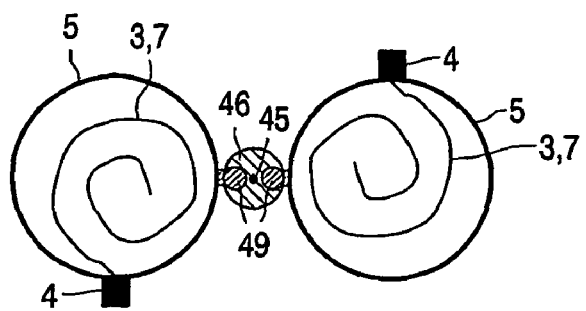
Figures 9A, 9B:
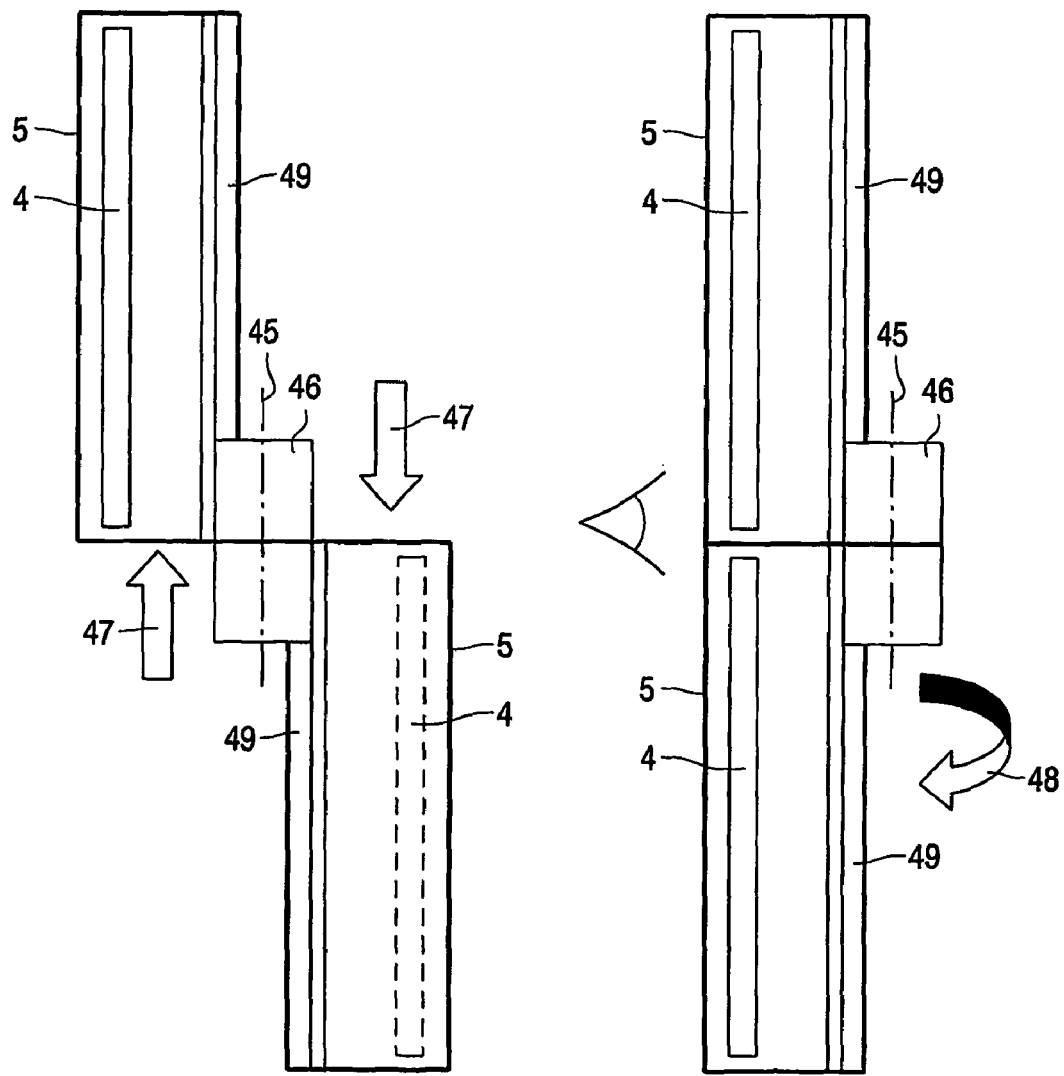
Figure 10:
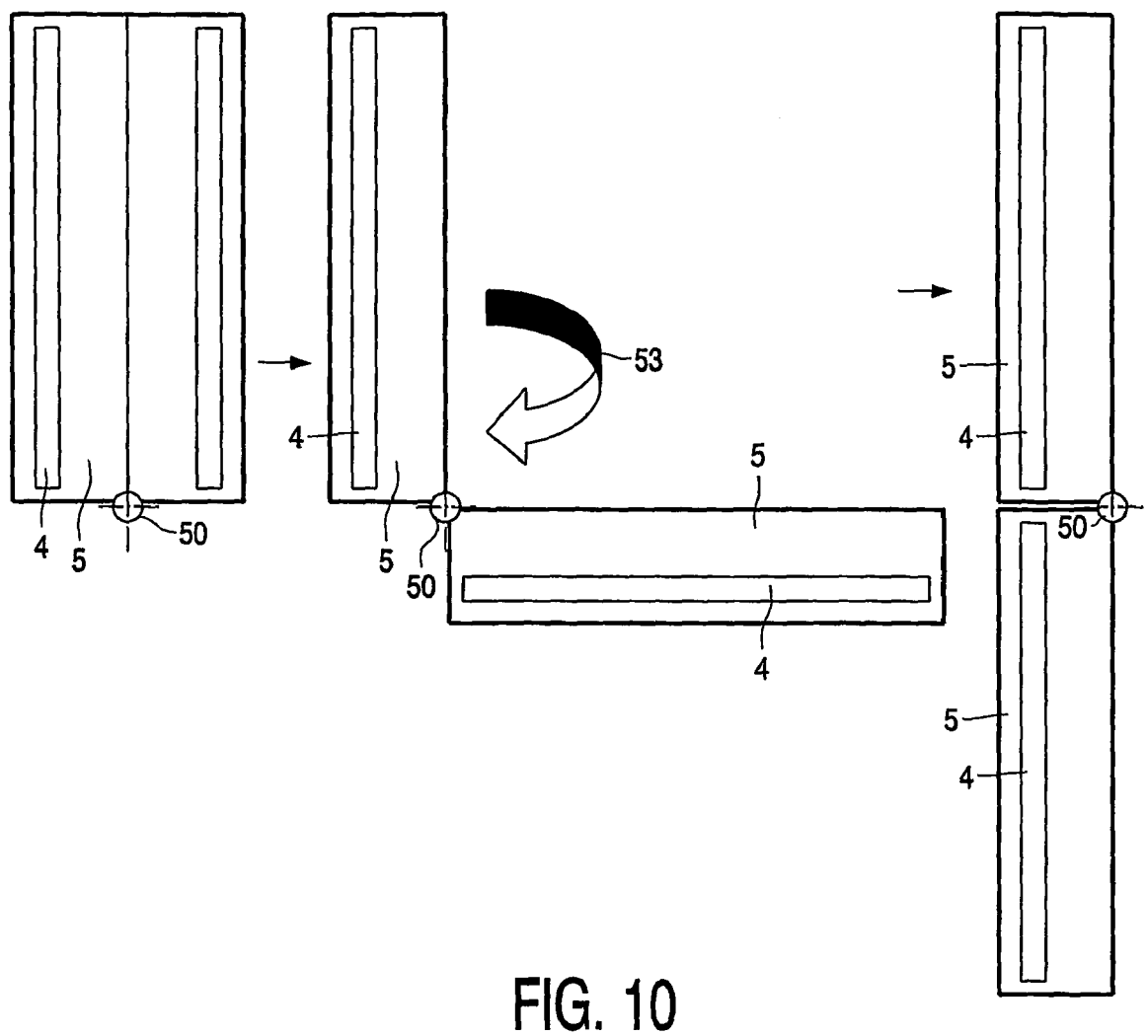
Figure 12:
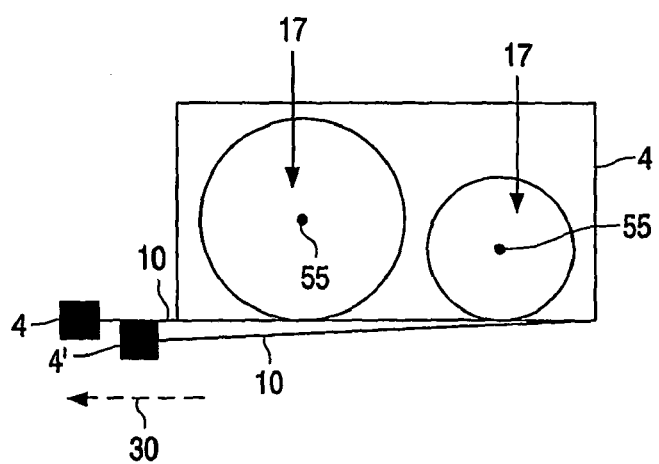
Figure 11:
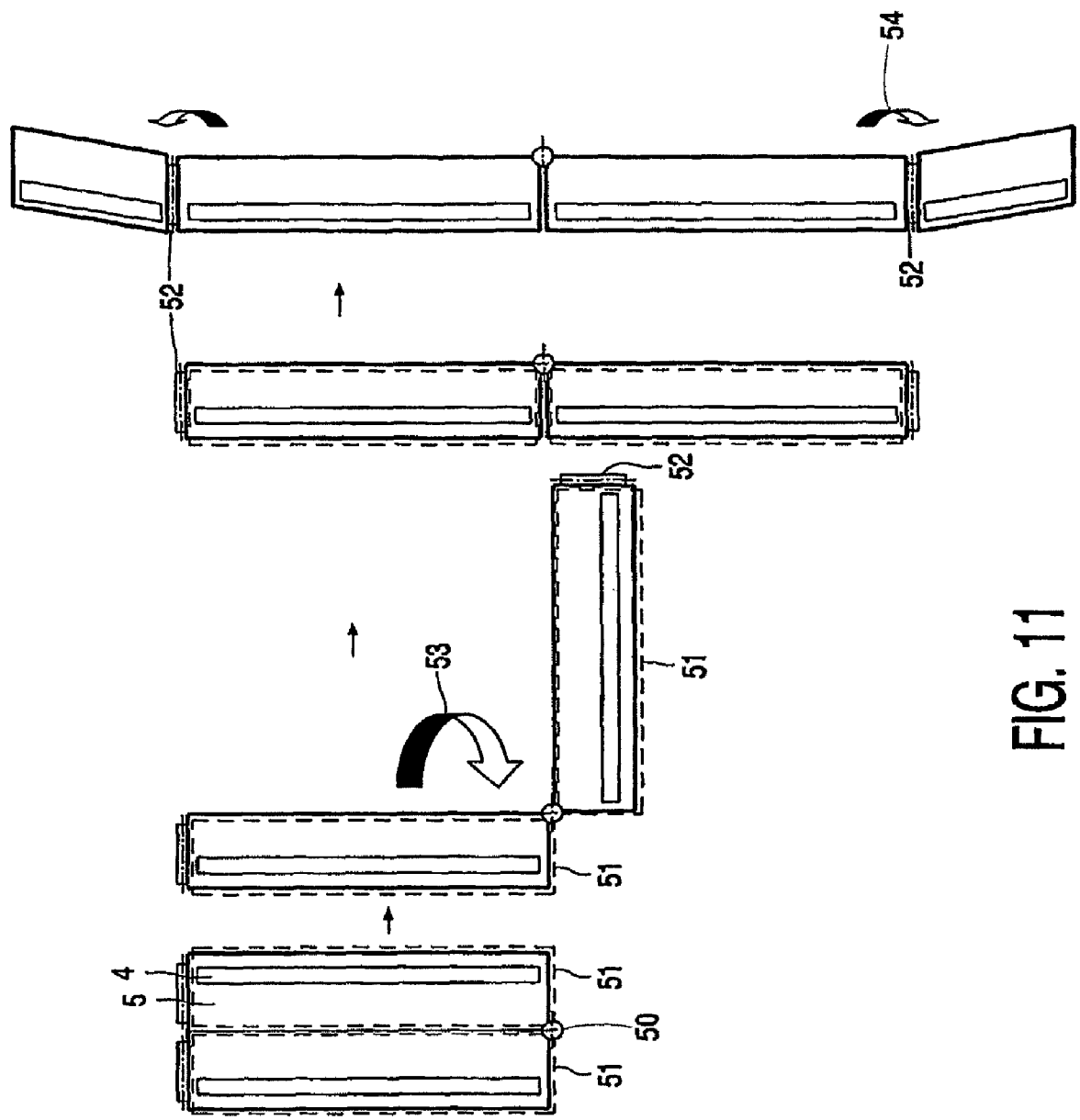
Figure 13:
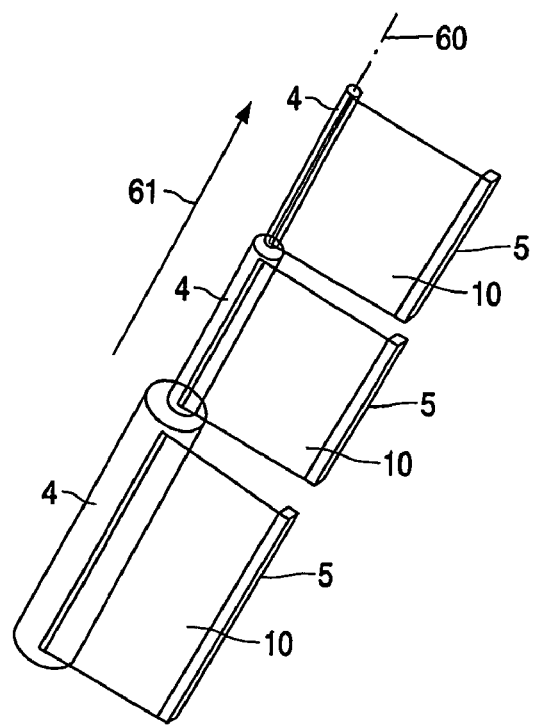
Figure 14:
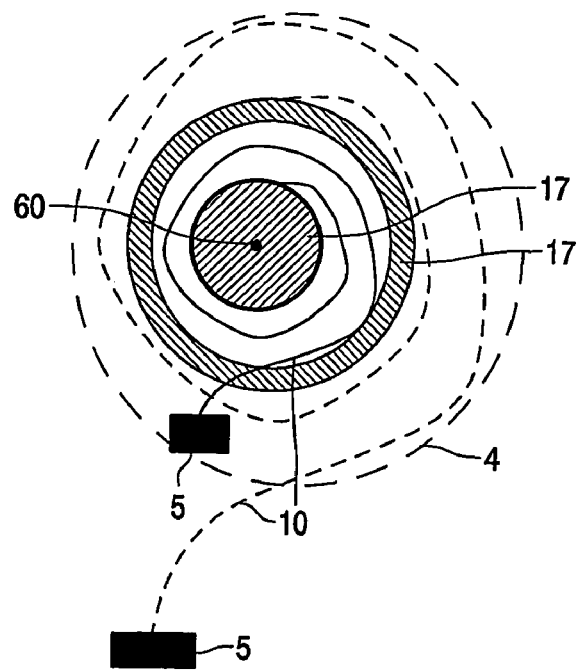

FIG. 2 shows embodiments of the invention having a panel device with a replaceable display panel and/or touch panel according to the invention, FIG. 3 is an electrical equivalent of a part of a rollable display panel and/or touch panel according to the invention, FIG. 4 shows a housing of a device according to the invention, FIGS. 5 and 6 show an embodiment of a device according to the invention to realize the applications as shown in FIG. 2, FIGS. 7, 8 and 9 show a further embodiment of a device according to the invention, FIGS. 10 and 11 show another, further embodiment of a device according to the invention, while FIG. 12 shows a housing of another device according to the invention and FIGS. 13 and 14 show another, further embodiment of a device according to the invention The Figures are diagrammatic and not drawn to scale. Corresponding elements are generally denoted by the same reference numerals.

FIG. 1 shows the use of such a display panel in a first kind of application. In FIG. 1$^a$ one typical example is given viz. the use of displays in an apparatus 1 in this example a mobile telephone. A typical display (panel) of the mobile telephone has dimensions of e.g. 2 cm×3 cm, whereas the mobile telephone itself has dimensions of e.g. 4 cm×10 cm. A panel device 2 comprises a rollable display 3, which is provided inside a housing 4, 5, 31 and may be interconnected to the mobile telephone (apparatus 1) via interconnecting pins 6. The housing in this example comprises two different parts 4, 5, the display panel 3 in this example being situated in sub-housing 5 in its rolled form, while part 4 comprises further driving electronics and e.g. batteries. FIG. 1$^b$ shows the unrolled display 3, which has dimensions of e.g. 10 cm×15 cm. In FIG. 1$^b$ unrolled display 3 is interconnected to the mobile telephone (apparatus 1) via interconnecting pins 6; this however is purely illustrative since a major part of applications will not use mechanical contacts, since more and more information is exchanged via electromagnetic coupling. The housing 4, 5 can be realized on such a way that the use of a replaceable panel (e.g. a replacement panel or a panel of another size, dependent the kind of application) is possible According to the invention (FIG. 2a) the panel device also comprises a further panel 7 in this example a replaceable touch panel 7 both panels 3, 7 being situated in sub-housings 5 again in their rolled form. In one kind of application the touch panel is keyboard (for typing purposes) having touch contacts 9 comparable to keyboard buttons or to touch buttons of a telephone. Another kind of application is shown in FIG. 2b in which two viewers 8, 8' each have command over touch panels 7, 7' while results are displayed on display screens 3, 3'. Both touch panels 7, 7' communicate with a central control unit, making interactive use by different viewers possible (if necessary via the apparatus 1). This makes the panel device 2 useful for e.g. gaming.

One of the advantages of having a replaceable display device or display panel is that it can be used on several apparatuses, provided some standardization has been agreed upon (display size, and if necessary handshake protocols).

FIG. 3 is an electric equivalent circuit diagram of a part of a possible (display) panel 3 according to the invention. It comprises in one possible embodiment (one mode of driving, called the "passive mode") a matrix of pixels or touch elements defined at the areas of crossings of row or selection electrodes and column or data (sensing) electrodes. The row electrodes are consecutively selected by means of row drivers 11 (via interconnection patterns 13), while the column electrodes are provided with data via data registers 12. On the other hand the data registers 12 may contain sensing electronic when the panel is used as a touch panel (part of the sensing electronics may on the other hand be realized in apparatus 1 or in housing 4). Mixed solutions are of course possible e.g. realizing these electronics (partly) in the housing 4 while the display panel has some simple electronics only.

To this end, further interconnections 13 between the row drivers and conductive pads 37 and between the data (sensing) registers and conductive pads 37 are provided on the flexible substrate 10. Reference numeral 14 represents the actual display or touch area.

In another possible embodiment (another mode of driving, called the "active mode") signals from the row drivers select pixels or sensing elements via thin-film transistors (TFTs) whose gate electrodes are electrically connected to row electrodes while the source electrodes are electrically connected to column electrodes These ways of driving display devices are generally known in the art. In other modes, also generally known in the art such matrix devices can be used as touch panels to detect touching using other detection schemes.

FIG. 4 schematically shows how part of the substrate 10 is fixed within a sub-housing 5. The sub-housing 5 in this example comprises a (spring-loaded) rolling device 17 for rolling up the flexible (display) substrate 10.

Support hinges 16 may reinforce the mechanical stability of the total construction. Furthermore in this example a locking mechanism 19 is schematically shown to lock the housing parts 4, 5 together when the display is in a rolled position. To release the (flexible) display device 3,10,14 again the housing part 4 has a push button 18.

The housing part 4 in this example comprises a printed circuit board 20. On the printed circuit board driver chips 21 and electrical interconnections 22 to interactive push buttons 18 (or other interaction devices) are provided together with electrical interconnections 22 which (via conductors 23) contact the array of contact pads 38, which may make contact to contact pads 37. The contact pads can be located on both sides of the display foil (as shown here) or only on one side. Also, it should be noted that this housing part 4 can contain further chips, batteries and in particular antennas to enable e.g. an RF link between the apparatus 1 and the display device 2, rather than through electrical interconnections 25 or between the display device 2 and the display panel 3, rather than through the connecting parts 6 drawn in FIG. 4. Especially the driver chips 21 or further circuitry on printed circuit board 20 may be used for the implementation of a (standard) protocol concerning the exchange of information, e.g. how to use different kinds of display panels (with different number of lines, number of columns etcetera) in different kinds of apparatuses. On the other hand it may be useful to provide as much control circuitry as possible in the apparatus 1

In this example the housing part 4 comprises two parts 4$^a$, 4$^b$ between which the display panel 14 (the flexible substrate 10) can be clamped for contacting the connecting parts 6 to conductors 23 (in this example double sided contacting is shown). In another embodiment the housing 4 may comprise only a slit to introduce display panel into a receiving section. The contact pads will be aligned with the display's contact areas through alignment pegs or recessions (holes 24) in the substrate 10 or any type of optical or mechanical feedback mechanism for proper alignment. Since the display will typically contain only a few contact pads these contacts can be large and therefore a rough alignment is sufficient.

The sub-housing 5 contains the rolling device 17 for rolling up the (flexible) display substrate 10. This sub-housing 5 in this example also comprises two parts 5$^a$, 5$^b$. The mechanism is designed in such a way that it can only open when the display panel 14 (the flexible substrate 10) is fully rolled out. Then, separating of the two parts 5$^a$, 5$^b$ will lock the spring-loaded roll-up mechanism so that it cannot roll back while the two parts are separated. In this fully rolled-out position the recession 26 (in the rolling device 17 in FIG. 4) for loading the display panel 3 is for example pointing downwards. The display panel 3 can then be unhooked from the hooks 27 (in the recession 26 in FIG. 4) that grab (and hold the display during normal operation as a result of the spring the rolls up the display) by moving it in the roll-up direction. The roll-up mechanism is locked in order to achieve this unhooking and a new display (foil) can then be applied over the hooks 27 (which will also serve as an alignment means in combination with holes 28 in the display, see FIG. 3). Upon closing of the two parts the spring is released and the new display is rolled up again.

In FIG. 4 a further sub-housing 5' contains a similar rolling device for rolling up the (flexible) touch substrate 10, 7 rolling towards the opposite case in this example; in this way the device 2 of FIG. 2*a* is realized.

In the embodiments shown above the sub-housing 5 is separated from the housing part 4 when the rollable panel parts 3, 7 are made visible but as can be seen from FIG. 5 in another embodiment a group of sub-housings 5 is situated along a housing part 4, while the panel parts 3, 7 can be extracted from said sub-housings as indicated by arrows 30. The device of FIG. 5 comprises four sub-housings 5, each containing a rolling device 17, which has been described more in detail with reference to FIG. 4. The assembly of sub-housings 5 and housing part 4, in this example has a common housing 31. Although the sub-housings 5 and housing part 4 have been drawn with a square cross-section, they may have circular or other cross-sections, comparable with e.g. those of films for photography or cross-sections of inkjet cartridges. The device of FIG. 5 is suitable for a function as described with reference to FIG. 2*b*.

FIG. 6 shows a device having a housing part 4 and sub-housings 5, which have circular cross-sections. In the embodiment of FIG. 6(*a*) each panel has its own driving section 40 as described with reference to FIG. 4. The embodiment of FIG. 6(*b*) has a common driving section 41. The common driving section 41 is able to rotate around an axis 42. In this example the driving section 41 comprises driver chips 21 on a cylindrical body 43. By rotation to a specific point electrical contact is obtained between said driver chips 21 and conductive pads 37 on the panels 3, 7 via a spring contact 44.

Figure 7:
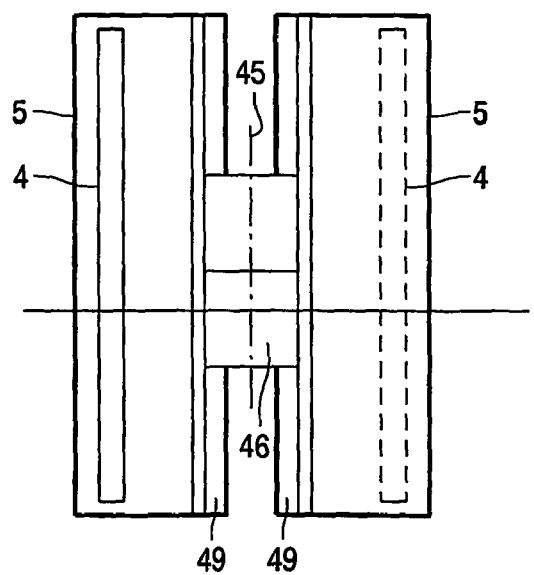

The device of FIGS. 7 and 8 comprises two sub-housings 5 comprising panels 3, 7. In this case one or both of the sub-housings 5 may slide with respect to an axis 45. This is reached in this example by a cylindrical housing 46 having spaces 49 for the housing parts 4.

After sliding (see arrow 47 in FIG. 9(*a*)) one of the sub-housings 5 rotates around axis 45 (see arrow 48 in FIG. 9(*b*)) to obtain a two-part display device having, in the case of a display device, both their display function directed towards a viewer 8. It goes without saying that one of the panels may have a touch function in stead of a display function. In this example the housing part 4 also functions as a pulling grip. Information retrieval for different sbdisplays is done either in a centralized way (when all housing parts 4 are present in the cylindrical housing 46, which also may comprise driving electronics; information may be provided to driving electronics in the cylindrical housing 46 or in housing parts 4 by electromagnetic radiation or by electromechanical contacts, not shown in FIG. 8) or in a decentralized way (housing parts 4 need not be present in the cylindrical housing 46; information is provided to the housing parts 4 by electromagnetic radiation).

The device of FIG. 10 shows two sub-housings 5 which are folded around an axis perpendicular to the drawing (see arrow 53 in FIG. 10) by using a hinge 50. By folding two sets 51 of two of such sub-housings 5, which sets are foldable around an axis 52 in the plane of the drawing a yardstick-like construction is obtained (FIG. 11) In this example a device showing four panels on top of each other is obtained by first unfolding sets 51 (see arrow 53 in FIG. 11) and then unfolding the sub-housings 5 of each set (see arrow 54 in FIG. 11).

The sub-housing 5 of FIG. 12 contains two rolling devices 17 for rolling up the (display) substrates 10, e.g. a display screen and a touch screen, while using two separate axes 55.

FIGS. 13 and 14 respectively schematically show a view and a cross-section of a further embodiment in which the housing parts 4,5 have a circular cross-section while three (two in FIG. 14) housing parts 4,5 in the one (substantially) unrolled state fit into each other around a central axis 60. After pulling or sliding the housing parts 4,5 out, the panels 10 can be unrolled to provide a combination of (in the example of FIG. 13) three different (display) panels.

These applications will be most attractive of course if a standard for the housings is agreed upon and if a (standard) protocol concerning the exchange of information exists, e.g. how to use different kinds of display panels (with different number of lines, number of columns etcetera) in different kinds of apparatuses.

The protective scope of the invention is not limited to the embodiments described, while the invention is also applicable to other display devices, for example, (O) LED displays, and other housing devices.

On the other hand the electronic apparatus 1 may be suited for different applications (e.g. both a telephone application and a calculator application) which each have different kinds of (display) panels (with different number of lines, number of columns etcetera). The display panels may even be realized in different technologies, e. g. (O)LED-technology for one display panel and LCD technology for another display panel.

In many of the possible applications the rolled out display area need not be visible from one single side. On the other hand the rollable display panels may be viewable from two opposite sides.

Also the interconnection between the apparatus and (part of) the display need not be of an electromechanical kind, such as shown. Electromagnetic coupling (infrared radiation) may be used to provide data to the display device or to the display panel.

Several mechanisms as known in the art for attaching a rollable substrate (film) to the housings or for storing the sub-housing 5 may be used.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A panel device having at least one housing, which comprises two panels being movable between a first position and a second position thereof, each separate panel of the two panels being rollable from a separate axis, said at least one housing comprises a sub-housing for each separate panel and at least one of the sub-housings being provided with connection means enabling coupling and uncoupling a housed one of the two panels such that said housed one of the two panels is removable and replaceable by a replacement panel.

2. A panel device according to claim 1 wherein at least one of the sub-housings is slidable along a first axis.

3. A panel device according to claim 2 wherein at least one of the sub-housings is rotatable with respect to the first axis.

4. A panel device according to claim 3 in which the sub-housings have a sliding device in common.

5. A panel device according to claim 4 in which the sliding device comprises driving electronics.

6. A panel device according to claim 1, in which at least two of the sub-housings are rotatable with respect to each other along a first axis.

7. A panel device according to claim 6, in which at least one of the sub-housings is rotatable with respect to a second axis substantially perpendicular to the first axis.

8. A panel device according to claim 1, in which the sub-housings have a driving device in common.

9. A panel device according to claim 8, in which the driving device is rotatable.

10. A panel device according to claim 1, in which said two panels incorporate first and second structural and/or functional characteristics.

11. A panel device according to claim 10, in which a first one of said two panels has a touch function and a second one of said at least two panels has a display function.

12. A panel device according to claim 1, in which said two panels are realized in a first panel technology for a first panel and a second panel technology for a second one of the two panels, the second panel technology differing from the first technology.

13. A panel device according to claim 1, in which the housing comprises at least three panels.

14. An electronic assembly comprising an electronic apparatus and the panel device according to claim 1 the electronic apparatus comprising means for providing panel parameters to an interface between the electronic apparatus and the panel device.

15. A panel device according to claim 2, in which at least one of the sub-housings is rotatable with respect to a second axis substantially perpendicular to the first axis.

16. A panel device having at least one housing, which comprises two panels being movable between a first position and a second position thereof, the two panels being rollable with respect to a common axis, said at least one housing comprises a sub-housing for each separate panel and at least one of the sub-housings being provided with connection means enabling coupling and uncoupling a housed one of the two panels such that said housed one of the two panels is removable and replaceable by a replacement panel.

17. A panel device according to claim 16 wherein at least one of the sub-housings is slidable along a first axis.

18. A panel device according to claim 16, in which the sub-housings have a driving device in common.

19. A panel device according to claim 16, in which said two panels are realized in a first panel technology for a first panel and a second panel technology for a second one of the two panels, the second panel technology differing from the first technology.

* * * * *